United States Patent [19]

Yanke

[11] Patent Number: 4,969,784

[45] Date of Patent: Nov. 13, 1990

[54] CARGO SECURING MECHANISM FOR PICK-UP TRUCKS OR THE LIKE

[76] Inventor: Louis M. Yanke, 1068 Big Eagle Trail, Carol Stream, Ill. 60188

[21] Appl. No.: 398,426

[22] Filed: Aug. 25, 1989

[51] Int. Cl.⁵ .............................................. B61D 45/00
[52] U.S. Cl. ..................................... 410/104; 410/150
[58] Field of Search ................. 410/55, 122, 123, 105, 410/91, 85, 96, 97, 101, 104, 111, 116, 137, 144, 151, 121

[56] References Cited

U.S. PATENT DOCUMENTS

| | | | |
|---|---|---|---|
| 2,605,064 | 7/1952 | Davis | 410/104 |
| 3,478,995 | 7/1969 | Lautzenhiser | 410/104 |
| 4,278,376 | 7/1981 | Hunter | 410/48 |
| 4,850,769 | 7/1989 | Mathews | 410/105 |

Primary Examiner—Joseph F. Peters, Jr.
Assistant Examiner—Virna Lissi Mojica
Attorney, Agent, or Firm—Charles F. Lind

[57] ABSTRACT

The disclosed cargo securing system has an elongated C-shaped channel track, an anchoring bracket adapted to cooperate with the track to slide axially therealong to any position along the track, and a threaded nut that can be tightened to frictionally lock the anchoring bracket in any axially located position along the track. Threaded members, such as self tapping screws or cooperating nut and bolt means, are used to secure the track relative to a cargo bed at a location appropriate and proximate for the cargo to be carried in the bed. Tie lines or like securing means can be routed between one or more of such anchoring brackets over and/or around the cargo carried in the bed operable to hold the cargo relative to the bed.

17 Claims, 1 Drawing Sheet

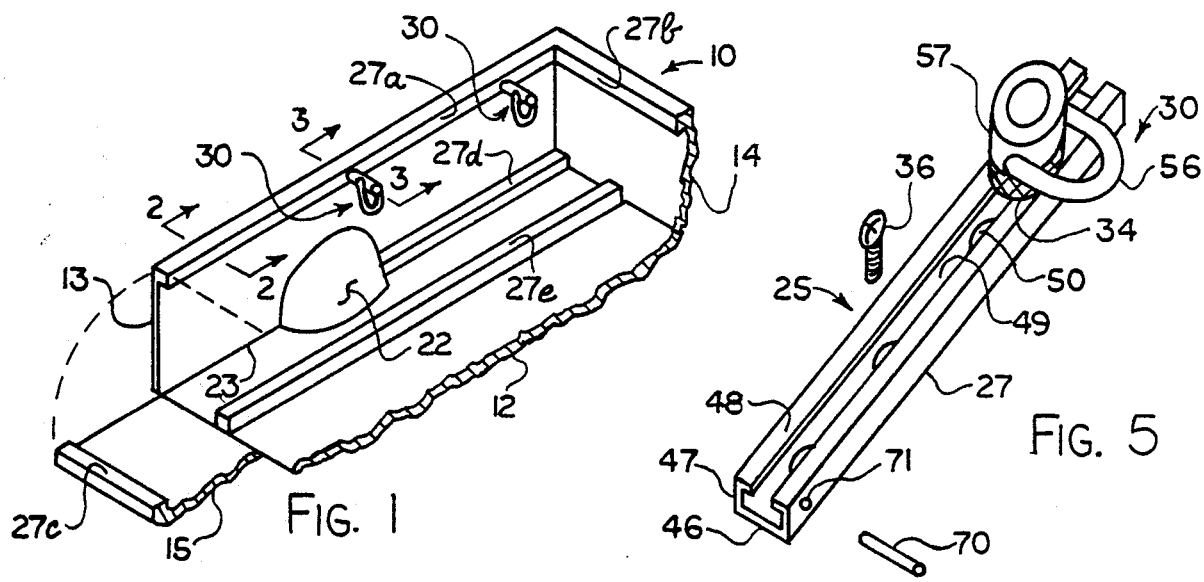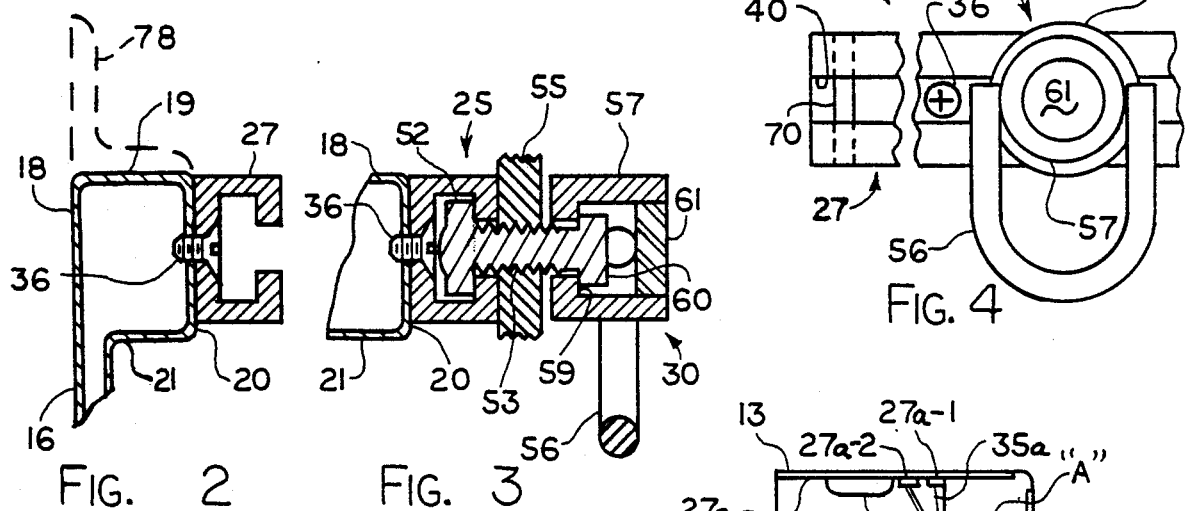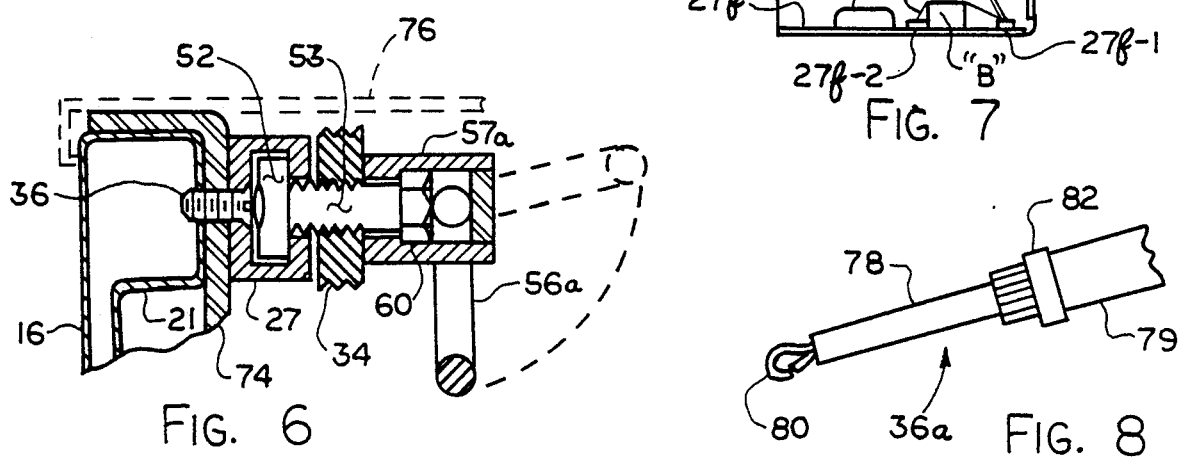

CARGO SECURING MECHANISM FOR PICK-UP TRUCKS OR THE LIKE

BACKGROUND OF THE INVENTION

Pick-up trucks have achieved great popularity, having a cargo bed with a substantially rectangular horizontal floor frequently between four and six feet wide and six and ten feet long, and with vertical sides between one and three feet high. Typically, stationary walls form the front and two adjacent sides, and a removeable or hinged tail gate forms the remaining rear side and provides access to the bed floor for cargo loading and unloading. The trucks are thus particularly suited to carry any article of most any size, even approximating the bed size.

However, as many bed floors are relatively smooth and flat, any carried article(s) smaller than the cargo bed itself can slide about on the bed floor under the dynamic forces created when the truck is being driven. Plastic bed liners for the cargo bed might provide greater friction against the carried article(s), but not enough to preclude that the carried article(s) do not yet slide around in the bed. A sliding article could fall from the truck, or could smash against the cargo bed sides to cause damage to the truck or itself and/or create instability in the driving characteristics of the truck. Thus, it is desirable and common when easily possible to secure the carried article(s) relative to the bed.

One effective common way of securing the carried article(s) relative to the bed is to wrap a flexible tie line around or over the carried article(s) and to connect the ends of the tie line to some fixed anchoring means on the truck body. The tie line can be in the form of wires, straps and/or ropes made of either inelastic or elastic material, and several tie lines could be used for holding heavy and/or large and/or several articles.

However, despite this obvious need, many pick-up truck bodies are stylishly constructed with the cargo bed being formed by closed sculptured upper sidewall edges, and with smooth bed walls and floor; so that there is no exposed anchoring means in the truck bed, making the use of tie lines difficult if not impossible.

Moreover, even those truck bodies that do provide exposed anchoring means, such as braces or webbing extended between the bed floor and wall and/or along the bed walls, such anchoring means are limited both in numbers and locations. For example, some truck bodies may provide two such rigid anchoring structures at the front and rear corners of each side wall, and possibly one additional anchoring structure along the side wall between the front and rear; but otherwise the cargo bed is void of suitable anchoring means for tie line means.

Anchor bolts and/or rails are also commerically available as accessory hardware items, so that a truck owner can secure any of these items where believed needed, such as at any or all of the above-mentioned locations, or at other locations including across the front or rear walls, on the bed floor or even outside of the cargo bed.

However, within the practical limits of the overall number of such anchoring structures provided with any typical cargo bed, there nonetheless will only be a specific number of them and only then at specific fixed locations relative to the bed. Because of this and the fact that the article(s) could be of virtually any ramdom size, the required routing of the tie line(s) frequently may yet provide inadequate or marginal means to hold the article(s) securely relative to the truck bed, unless extra tie lines are used to bolster the marginal routing paths.

SUMMARY OF THE INVENTION

This invention relates to mechanism suited to secure an article or several articles of cargo relative to a cargo bed, such as on pick-up trucks, cargo vans or the like, particularly where such carried article(s) may be randomly sized.

One object of the present invention is to provide mechanism, suited as an original equipment or accessory item that, when applied on a pick-up truck or other related cargo carrying means having a cargo bed, can define anchoring structures that may be easily and quickly used with conventional tie line means or the like for securely holding article(s) of random size relative to the bed.

Another object of the present invention is to provide a cargo securing mechanism that define anchoring structures that during use can easily, quickly and without tools be adjusted to provide effective and direct routing of any tie line or other securing means connected thereto, for holding the carried article(s) relative to the bed.

Another object of the present invention is to provide cargo securing mechanism according to the previous objects, suited when applied on a pick-up truck or other related cargo bed, to be positioned substantially out of the way and specifically at locations that do not interfere with the use of a closure cover or cab secured in place and extended over the cargo bed.

To achieve these and other objects, the present cargo securing mechanism may provide elongated track means, and means to secure the track means relative to a cargo bed of a pick-up truck or the like; slide means that cooperate with the track means to be moved axially therealong, and means for locking the slide means at any selected axial position relative to and along the track means; and exposed anchoring means connected to and carried by the slide means, to be positioned at any selected axial position relative to and along the track means. Thus, conventional tie lines or other cargo securing means can be routed between the anchoring means and the carried cargo, to hold the cargo in place relative to the bed.

BRIEF DESCRIPTION OF THE DRAWINGS

Further objects, advantages and features of the present invention will appear from the following disclosure and description, including as a part thereof the accompanying drawings, in which:

FIG. 1 is a somewhat schmmatic perspective view of a typical cargo bed of a pick-up truck, showing several preferred locations for mounting the subject mechanism relative to the bed;

FIGS. 2 and 3 are enlarged fragmentary sectional views, as taken respectively from lines 2—2 and 3—3 in FIG. 1, showing additional details of the subject mechanism;

FIG. 4 is an elevational view of part of the mechanism illustrated in FIG. 3;

FIG. 5 is a perspective view of major components forming the subject mechanism illustrated in the previous figures;

FIG. 6 is a fragmentary sectional views, similar to FIG. 3, except of an alternative embodiment of the subject mechanism;

FIG. 7 is a top plan view, somewhat as a schematic of a typical cargo bed of a pick-up truck, showing several manners of use of the subject mechanism; and FIG. 8 is a perspective view of part of rigid cross bar means that may be used with the subject mechanism in the manner illustrated in FIG. 7.

Certain details of construction may be omitted from one or more of the figures, when they are illustrated adequately in another.

DETAILED DESCRIPTION OF ILLUSTRATED EMBODIMENTS

FIG. 1 shows one side of a typical pick-up truck cargo bed 10, having a flat floor 12 and stationary side walls 13 and front wall 14 upstanding therefrom, and having a rear wall or tail gate 15 hinged adjacent the rear of the floor 12 for cargo loading and unloading. The cargo bed 10 illustrated has a continuous sheet of material stamped or otherwise formed to define an outer wall section 16 (see FIG. 2), and a closed top section 18 consisting of a generally flat narrow horizontal top face 19, a generally flat narrow vertical rim face 20, and an under face 21 that is lapped and connected to the outer wall section 16. Wheel well walls 22 may interrupt the intermediate part of the bed floor 12 and the side walls 13, projecting slightly toward on another, to reduce the carrying capacity of the cargo bed somewhat and interrupt the otherwise straight interior corners 23 between the floor and the side walls.

FIG. 5 shows the subject cargo securing mechanism 25 by itself, while FIGS. 2-4 show the mechanism secured in place relative to the cargo bed 10. The mechanism 25 illustrated consists of an elongated track 27; anchoring means 30 that can be moved axially along the track 27 to any axial position therealong; and lock means 34 that can effectively hold the anchoring means 30 as so positioned axially on the track 27. The track 27 is adapted to be secured relative to the cargo bed 10 by means 36.

In FIGS. 1 and 7, possible locations and/or uses of the subject securing mechanism 25 are illustrated, whereby different track means 27a, 27b, 27c, 27d, 27e and/or 27f can be mounted on suitable support surfaces relative to the cargo bed 10. Thus, tracks 27a and 27f might be mounted on the inner rim faces 20 of the opposed side walls 13, to allow the anchoring means to be adjusted to any location along the length of the track. Alternatively or additionally track 27b might be mounted on the inner rim face 20 of the front wall 14 and/or track 27c might be mounted on the inner rim face 20 of the rear or tail gate wall 15. Again alternatively or additionally, tracks 27d and/or 27e might be mounted on the bed floor, to extend either front-to-rear as illustrated and/or crosswise (not shown) of the cargo bed, and can be adjacent or spaced from the upstanding walls.

One, two or more independent anchoring means 30 will typically be carried on each different track 27 Securing means, such as flexible tie lines, thus can be routed around or adjacent the carried article, from one anchoring means to another, and connected to the anchoring means to hold the article relative to the cargo bed. The anchoring means 30 used to hold any article can be on the same track or on different tracks, including being on opposite sides of the bed. Thus, in FIG. 7, article "A" could be held by flexible tie line 35a secured at its ends to anchoring means 27a-1 on track 27a and to anchoring means 27b-1 on track 27b, and by rigid cross bar 36a extended between anchoring means 27a-2 on track 27a and anchoring means 27f-1 on track 27f. Likewise, article "B" could be held by flexible tie line 35b secured at its ends to anchoring means 27f-1 and 27f-2 on track 27f.

It will be appreciated that the ends (not shown) of the conventional flexible tie lines can be looped through the defined eyelet of the axially adjusted anchoring means 30 and tied, for connecting the tie lines relative to the cargo bed 10. Also, the anchoring means eyelet will readily accomodate and hold a metal hook (not shown) commonly provided at the ends of elastic securing straps, after the straps have been routed around or over the article(s) and stretched to the proper degree. The separate anchoring means 27a-1 and 27f-1 may be secured in place along its track, to snug the cross member against the carried article "A", for securing it within the cargo bed.

In a preferred embodiment, the track 27 is a C-shaped channel having a substantially flat base wall 46, side walls 47 upstanding from the base wall, and lap walls 48 extended inwardly from the side walls but ending spaced apart to leave an open slot 49 opposite the base wall 46. Countersunk openings 50 are closely spaced apart axially along the base wall 46 to accept the track securing means 36, in the form of tapered head screws or bolts, thereby firmly securing the channel to the cargo bed while keeping the channel interior relatively smooth and open. For securing the track 27 where there is no access to the underside of the mounting cargo bed wall 20, self-tapping metal screws can be used as the securing means 36 (see FIGS. 2, 3 and 6). However, where there is access to the underside of the mounting bed wall, a washer and nut may be used with a threaded bolt (none of these being shown) to form the securing means 36.

The anchoring means 30 is carried relative to the track 27 in part by a slide means in the form of a thin rectangular plate 52, small enough to slide freely within the channel but large enough to be contained nonrotatably by the channel. A bolt 53 is welded or otherwise nonmovably connected to the slide plate 52 and projected through the channel slot 49; and the lock means 34 can be in the form of a nut threaded onto the bolt 53. The nut 34 can thus be tightened against the adjacent track lap walls 48 for pinching the lap walls between it and the slide plate 52, for holding the anchoring means 30 axially fixed relative to the track. The exterior edge 55 of the lock nut 34 can be knurled to allow the nut to be finger-tightened, to eliminate the need for using any tools when positioning and locking the anchoring means 30 axially along the track means 27.

The anchoring means 30 is illustrated as a U-shaped bar 56 carried on cup-shaped member 57 and defining a closed eyelet, the bolt 53 being fitted rotatably through an opening in cross wall 59 of the member 57 and having a head 60 retaining the member thereon. As is illustrated in FIGS. 3–5, the ends of the bar 56 can be welded rigidly to the member 57; or as is illustrated in FIG. 6, the ends of the bar 56a can rotatably fit within aligned opposed openings in the member 57a, to pivot throughout an arc of approximately 180 degrees. When the anchoring means bar 56 is nonmovable relative to the member 57, it is preferably disposed within a plane extended normal to the bolt 53 and/or parallel to the track 27, to minimize its projection away from the track and/or into the interior of the cargo bed 10. A closure plug 61 can be friction-fitted into the open end of the cup-shaped member 57.

The maximum gap between the slide plate 52 and cross wall 59 is slightly larger than the thichness of the channel lap walls 48 and the lock nut 34, to allow the slide plate 52 to be moved axially along the channel when the lock nut 34 is threaded away from the channel 27. However, when the lock nut 34 is threaded tightly against the channel lap walls 48, the slide plate 52 is effectively locked axially relative to the channel 27; and this can be done at any axial position along the channel. In this axially locked position, the lock nut 34 is spaced from the cross wall 59 to allow the anchoring means bar 56 to be rotated relative to the bolt head and the channel. This allows the defined bar eyelet to be be extended in the direction of the pull created by the tie line.

On the other hand, when the lock nut 34 is threaded tightly against the cross wall 59, the bar 56 becomes rotatably keyed relative to the channel. This feature may be important in the manner of holding a particular article, if the axial keying of the anchoring means along the track in not needed. An alternative embodiment (not shown) could have two separate but adjacent lock nuts threaded on the bolt stem, to have one nut then that can be threaded tightly against the channel, to lock the slide plate axially relative to the channel; and to have one nut that can be threaded tightly against the cross wall, to rotatably key the anchoring means relative to the channel.

In the commerical marketing and use of the subject mechanism, the channel 27 could be made to any length, but would typically correspond approximately or to a somewhat standard length of a pick-up truck cargo bed or the like. Thus, it could be easily connected relative to the cargo bed, as generally illustrated for example along the vertical rim face 20. The channel may be open at its ends, so that additional anchoring slides can be added thereon as needed or desired. However, to help minimize the thief of any anchoring slide carried on a channel, the channel ends may be closed, as for example by a C-pin 70 driven into aligned openings 71 in the channel side walls, which pin could not then be removed without an appropriate punch tool. A more permanent end closure could be defined, if desired, such as by spot welding the pin 70 to the channel.

The track means 27 can be applied directly against the structure defining the cargo bed 10, such as on a pick-up truck; or it can be applied over a conventional liner 74 for the cargo bed. Moreover, even with the mechanism track 27 secured to the vertical cargo bed wall 20, a conventional soft cover (shown in part only in phantom in FIG. 6 as 76) can be secured over the open top of the cargo bed 10, to pass over the track 27 and anchoring means 30 thereon without interferring with either. Also, a conventional hard bed cap (again being shown in part only in phantom in FIG. 2 as 78) can be positioned on and secured to the top face 19 of the cargo bed 10, to enclose the cargo bed, without interferring with the track 27 and anchoring means 30 held in place on the rim face 20.

When using the rigid cross member 36a, its length will be suited to span the width of the cargo bed 10 between separate appropriate anchoring means 27a-1 an 27f-1 carried on the separate track means 27a and 27f. The rigid cross member 36a (FIG. 8) may include separate telescoping end pieces 78 and 79 suited to be adjusted lengthwise to span between the anchoring means, and each having an eyelet 80 formed thereon suited to cooperate with and be connected to the anchoring means 30. Suitable lock means 82 of conventional construction, such as gripping fingers on one of the end pieces biased by a camming ring threaded on the one end pieces frictionally against the other end piece to provide positive adjustment and retention of the cross member 36a at its set length.

While only specific embodiments of the invention have been illustrated, variations may be made therefrom without departing from the inventive concept. For example, the anchoring means 30 could be modified, from an enclosed eyelet to possibly a tee-bar configuration or the like. Accordingly, the invention is to be limited only by the scope of the following claims.

What is claimed as my invention is:

1. A cargo securing system for a cargo bed of a pick-up truck or the like, comprising the combination of an elongated C-shaped channel track having a substantially flat base wall, side walls upstanding from the base wall, and lap walls extended inwardly from the side walls but ending spaced apart to leave an open slot opposite the base wall;

a slide member having a stud fixably secured thereto, said slide member fitting within the channel with said stud projecting through the open slot and beyond the channel track, and said slide member and stud being adapted to slide axially along the channel track while not being rotatable relative to the channel track;

an anchor member and means carried thereon defining an eyelet, said anchor member having a cross wall with an opening therein receiving the stud and allowing rotation of the anchor member and eyelet thereon about the longitudinal axis of the stud, and means on said stud engagable with the anchor member cross wall operable to limit separation of the member away from the channel track; and means to secure the track at its base wall relative to the cargo bed at a location appropriate for the cargo; whereby tie lines or like securing means can be routed between the eyelet and the cargo carried in the bed operable to hold the cargo relative thereto.

2. A cargo securing system according to claim 1, further including a lock member threaded onto a threaded portion of the stud between the channel track and the anchor member, operable to be moved against the lap walls of the channel track so as to frictionally hold the slide member fixed relative to the channel track at any selected position axially along its length, while allowing the anchor member and eyelet thereon to be rotated around on the stud to any radial alignment relative the stud.

3. A cargo securing system according to claim 1, further including a lock member threaded onto a threaded portion of the stud between the channel track and the anchor member, operable to be moved against the anchor member so as to frictionally hold the anchor member fixed relative to the stud at any selected position rotatably of the stud.

4. A cargo securing system according to claim 1, further including a lock member threaded onto a threaded portion of the stud between the channel track and the anchor member, said lock member being operable to be moved against the lap walls of the channel track so as to frictionally hold the slide member fixed relative to the channel track at any selected position axially along its length, while allowing the anchor member and eyelet thereon to be rotated around on the stud to any radial alignment relative the stud, and alternatively said lock member being operable to be moved against the anchor member so as to frictionally hold the anchor member fixed relative to the stud at any selected position rotatably of the stud.

5. A cargo securing system according to claim 1, further including first and second lock members threaded onto a threaded portion of the stud between the channel track and the anchor member, said first lock member being operable to be moved against the lap walls of the channel track so as to frictionally hold the slide member fixed relative to the channel track at any selected position axially along its length, while allowing the anchor member and eyelet thereon to be rotated around on the stud to any radial alignment relative the stud, and said second lock member being operable to be moved against the anchor member so as to frictionally hold the anchor member fixed relative to the stud at any selected position rotatably of the stud.

6. A cargo securing system according to claim 1, further including the eyelet being in the form of a generally U-shaped bar having opposite ends thereof rotatably received and held within aligned opposed openings in the anchor member, operable to have the eyelet pivot throughout an arc about an axis lying in a plane extended substantially parallel to the channel track.

7. A cargo securing system according to claim 1, further including the eyelet being in the form of a generally U-shaped bar having opposite ends thereof fixably secured to the anchor member, and the bar lying in a plane extended substantially parallel to the channel track.

8. A cargo securing system according to claim 1, further wherein the channel track is open at its ends, whereby additional slide plates can be added thereon as needed; and means to close the channel ends to minimize unauthorized removal of any slide plate carried on the channel track.

9. A cargo securing system according to claim 8, further wherein said closing means is in the form of a C-pin driven into aligned openings in the channel track side walls, so that its removal is possible only with an appropriate tool.

10. A cargo securing system according to claim 8, further wherein said closing means is in the form of a pin driven into aligned openings in the channel track side walls and welded to the channel track to make the closing means substantially permanent.

11. A cargo securing system according to claim 4, further including the eyelet being in the form of a generally U-shaped bar having opposite ends thereof rotatably received and held within aligned opposed openings in the anchor member, operable to have the eyelet pivot throughout an arc about an axis lying in a plane extended substantially parallel to the channel track.

12. A cargo securing system according to claim 4, further including the eyelet defining means being in the form of a generally U-shaped bar having opposite ends thereof fixably secured to the anchor member, and the bar lying in a plane extended substantially parallel to the channel track.

13. A cargo securing system according to claim 12, further wherein the anchor member is cup-shaped having a side wall upstanding from the cross wall and extended in the direction away from the channel track, and a closure plug press-fit against the side wall and into the open end of the cup-shaped anchor member.

14. A cargo securing system according to claim 12, further wherein the channel track is open at its ends, whereby additional slide plates can be added thereon as needed; and means to close the channel ends to minimize unauthorized removal of any slide plate carried on the channel track.

15. A cargo securing system according to claim 14, further wherein said closing means is in the form of a C-pin driven into aligned openings in the channel track side walls, so that its removal is possible only with an appropriate tool.

16. A cargo securing system according to claim 14, further wherein said closing means is in the form of a pin driven into aligned openings in the channel track side walls and welded to the channel track to make the closing means substantially permanent.

17. A cargo securing system according to claim 14, further wherein the anchor member is cup-shaped having a side wall upstanding from the cross wall and extended in the direction away from the channel track, and a closure plug press-fit against the side wall and into the open end of the cup-shaped anchor member.

* * * * *